United States Patent [19]

Montgomery et al.

[11] 4,276,008
[45] Jun. 30, 1981

[54] APPARATUS FOR MOLDING EXPANDABLE THERMOPLASTIC POLYMER PARTICLES

[75] Inventors: Robert L. Montgomery; Stuart B. Smith, both of Conyers, Ga.

[73] Assignee: Southeastern Foam Products, Inc., Conyers, Ga.

[21] Appl. No.: 71,473

[22] Filed: Aug. 31, 1979

Related U.S. Application Data

[62] Division of Ser. No. 827,873, Aug. 26, 1977, abandoned.

[51] Int. Cl.³ ............................................. B29D 27/00
[52] U.S. Cl. .................................... 425/4 R; 264/51; 264/DIG. 9; 425/403.1; 425/442; 425/444; 425/812
[58] Field of Search ............... 425/4 R, 817 R, 405 R, 425/442, 441, 444, 436 R, 436 RM, 403.1, 812; 264/51, DIG. 9

[56] References Cited

U.S. PATENT DOCUMENTS

| | | | |
|---|---|---|---|
| 2,707,802 | 5/1955 | Gard | 425/812 X |
| 2,752,635 | 7/1956 | Miller | 425/812 X |
| 3,086,248 | 4/1963 | Culp | 264/53 |
| 3,158,903 | 12/1964 | Fischer et al. | 425/817 R X |
| 3,160,919 | 12/1964 | Carter | 425/817 R X |
| 3,214,794 | 11/1965 | Otis | 425/4 R |
| 3,235,908 | 2/1966 | Thompson | 425/4 R |
| 3,247,545 | 4/1966 | Sullivan | 425/444 |
| 3,419,648 | 12/1968 | Leach | 264/51 X |
| 3,452,124 | 6/1969 | Knapp | 264/53 |
| 3,577,360 | 5/1971 | Immel | 264/101 X |
| 3,587,134 | 6/1971 | Premo | 425/4 R X |
| 3,733,159 | 5/1973 | Coffman | 425/812 X |
| 3,752,437 | 8/1973 | Saidla | 425/442 X |
| 3,756,756 | 9/1973 | Wilson et al. | 425/812 X |
| 3,765,814 | 10/1973 | Yaita | 425/817 R X |
| 3,837,769 | 9/1974 | Erlenbach | 425/4 R |
| 3,986,811 | 10/1976 | Gunnels | 425/436 R M X |
| 4,032,609 | 6/1977 | Smith | 264/53 |
| 4,106,884 | 8/1978 | Jegelka | 425/4 R X |

FOREIGN PATENT DOCUMENTS

| | | | |
|---|---|---|---|
| 756398 | 3/1971 | Belgium | 425/817 R |
| 2051525 | 3/1972 | Fed. Rep. of Germany | 425/817 R |
| Ad.77676 | 2/1962 | France | 425/436 R |
| 2225270 | 12/1974 | France | 425/4 R |
| 2225271 | 12/1974 | France | 425/817 R |
| 732287 | 6/1955 | United Kingdom | 425/812 |

Primary Examiner—Philip Anderson
Attorney, Agent, or Firm—Newton, Hopkins & Ormsby

[57] ABSTRACT

Expandable thermoplastic polymer beads are introduced into a tank and are agitated therein in a heated moisture-free condition. The beads are pressurized within the tank with a hot gaseous medium to soften them and are then subjected within the tank to a selected degree of vacuum to expand the beads or particles. The vacuum is removed and atmospheric pressure is re-established in the tank. The expanded hot moisture-free particles are introduced into a mold where they are fused into an integral mass, followed by cooling of the fused mass within the mold to form an outer skin on the mass. The fused mass is ejected from the mold.

8 Claims, 9 Drawing Figures

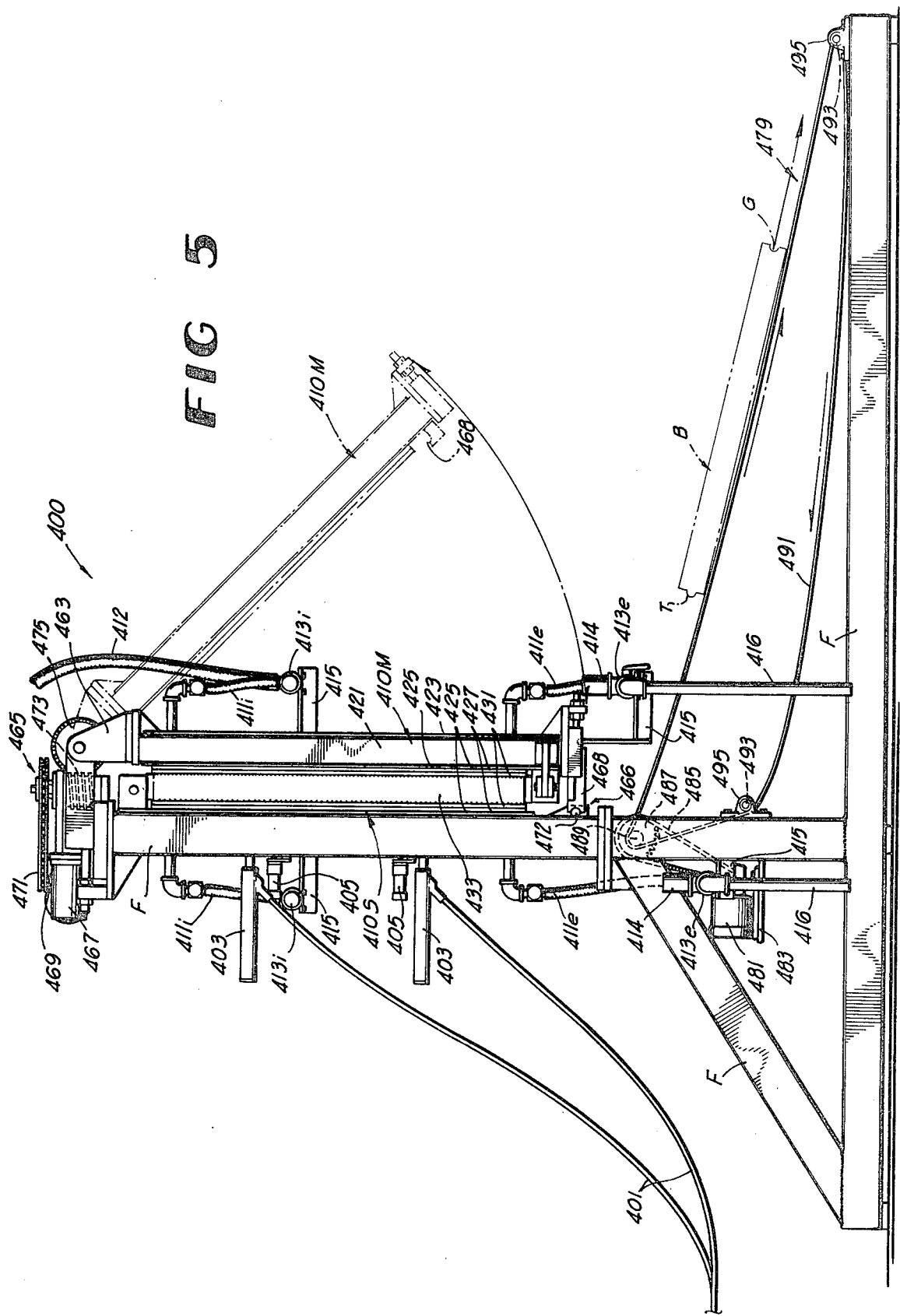

APPARATUS FOR MOLDING EXPANDABLE THERMOPLASTIC POLYMER PARTICLES

This is a division of application Ser. No. 827,873, filed Aug. 26, 1977 and now abandoned.

BACKGROUND OF THE INVENTION

In the prior art, the processing of expandable polystyrene beads has consistently included an intermediate step of steam pre-expansion. Polystyrene beads containing about six percent of pentane gas at a bulk density of 40 pcf is metered into a large cylindrical tank with live steam. The steam permeates the beads, softening them and vaporizing the pentane to cause expansion of the beads usually in the density range of about 1 to 5 pcf. The freshly expanded material contains pentane vapor and condensed steam. As the material cools, a negative pressure is created in the cells of the beads. The surface of the beads contains moisture and the beads must be delivered to storage bins to allow the surface moisture to evaporate and the excess pentane to escape while air permeates the material to create molding stability. This storage process usually requires twenty-four hours.

The resulting aged and matured material known in the art as prepuff is now ready for molding. Molding is customarily done in a large block mold eight or sixteen feet long by fifty inches in height, by about twenty inches thick. The prepuff is metered into the mold cavity by gravity until the cavity is filled. The large molds have steam chambers on both sides. The steam enters through vents in the side walls softening the prepuff and causing it to expand. Because the material is confined in the mold cavity, it can be fused into an integral mass with heat and pressure. However, if too much steam enters the mold cavity, severe shrinkage, long cycles and trapped moisture in the material results. Also a very large steam source is required for the process. After molding, approximately twenty-four hours curing time is required to allow complete shrinkage and stabilization of the molded product. If a relatively large amount of water is trapped in the product during molding, severe cutting problems result.

Conventional block molds sold for this operation are made oversize to allow for shrinkage and collapse. Normally, twelve to fifteen percent of the material is lost in the process. Additionally, because of the thickness of the large block molds, there exists a great density gradient from the middle of the board to its outside skins, causing variations in the physical properties from one cut board to another.

The conventional method, as described, also produces a product which, if ignited, will show pentane flashes for at least a week after molding. In the present invention, a new process has been devised which reduces power consumption, shortens cycles, and saves on material and manpower.

Examples of the patented prior art are contained in U.S. Pat. Nos. 3,577,360 and 4,032,609.

SUMMARY OF THE INVENTION

The above-described expandable polystyrene beads or particles are metered into a large cylindrical tank heated by a heat transfer fluid. The material in the tank is wiped by the action of blades against the heated tank walls. The tank has been pressurized with dry hot air for a predetermined time to cause the beads to soften uniformly without expansion. After such softening, a vacuum is applied to the tank and the material is allowed to expand to a desired density. Excess pentane gas is also removed in this process. After being subjected to vacuum, the tank is allowed to return to atmospheric pressure and the material is then discharged into a holding bin. From this bin the material is fed directly into a mold while still hot, and completely moisture-free. The material is fed through injector tubes into the mold cavity where it is fused into an integral mass, cooled and ejected from the mold cavity. The resulting molded board is completely stable with excellent fusion, no trapped moisture, and requires no cutting or post operations. In the molding procedure, either square edge, beveled, shiplap or tongue-in-groove board can be produced. The process is fully automatic and requires much less energy than the conventional processes. The invention differs notably from the commercial UNI-TEX system under U.S. Pat. No. 4,032,609 because it utilizes vacuum which removes almost all of the pentane from the prepuff; and differs from the process in U.S. Pat. No. 3,577,360 because it does not utilize any addition of a coolant to cool and stabilize the prepuff during expansion. The product molded by the invention shows no tendency to flash if ignited and exhibits higher physical properties than the conventional cut product of equal density. Boards can be produced under the invention in any density from about 0.8 pcf to 15 pcf. Conventional block molds cannot produce an acceptable product above about 2 pcf density.

The molding apparatus of the invention is unique in its construction and enables boards to be molded from one-half inch up to twelve inches in thickness. The mold platens show no deflection at 15 psi during molding.

The steam system of the invention uses superheated steam through steam channels and this enables foam board to be fused at 2 to 6 psi unlike conventional molds which require 8 to 15 psi for fusion with saturated steam. Unlike conventional block molds which steam both sides of the product simultaneously, trapping water, the present process steams from one side only through the product in one direction forcing out pentane, air and moisture. This reduces cycles, shrinkage and internal defects and provides a product of much more uniform density. In the invention, water is added after steaming to cool the large mold plates and set up the skin on the board for easier ejection.

Other features and advantages of the invention over the known prior art will become apparent during the course of the following detailed description.

BRIEF DESCRIPTION OF THE DRAWINGS

FIG. 5 is an enlarged end elevational view of a molding apparatus.

DETAILED DESCRIPTION

Figure 1:
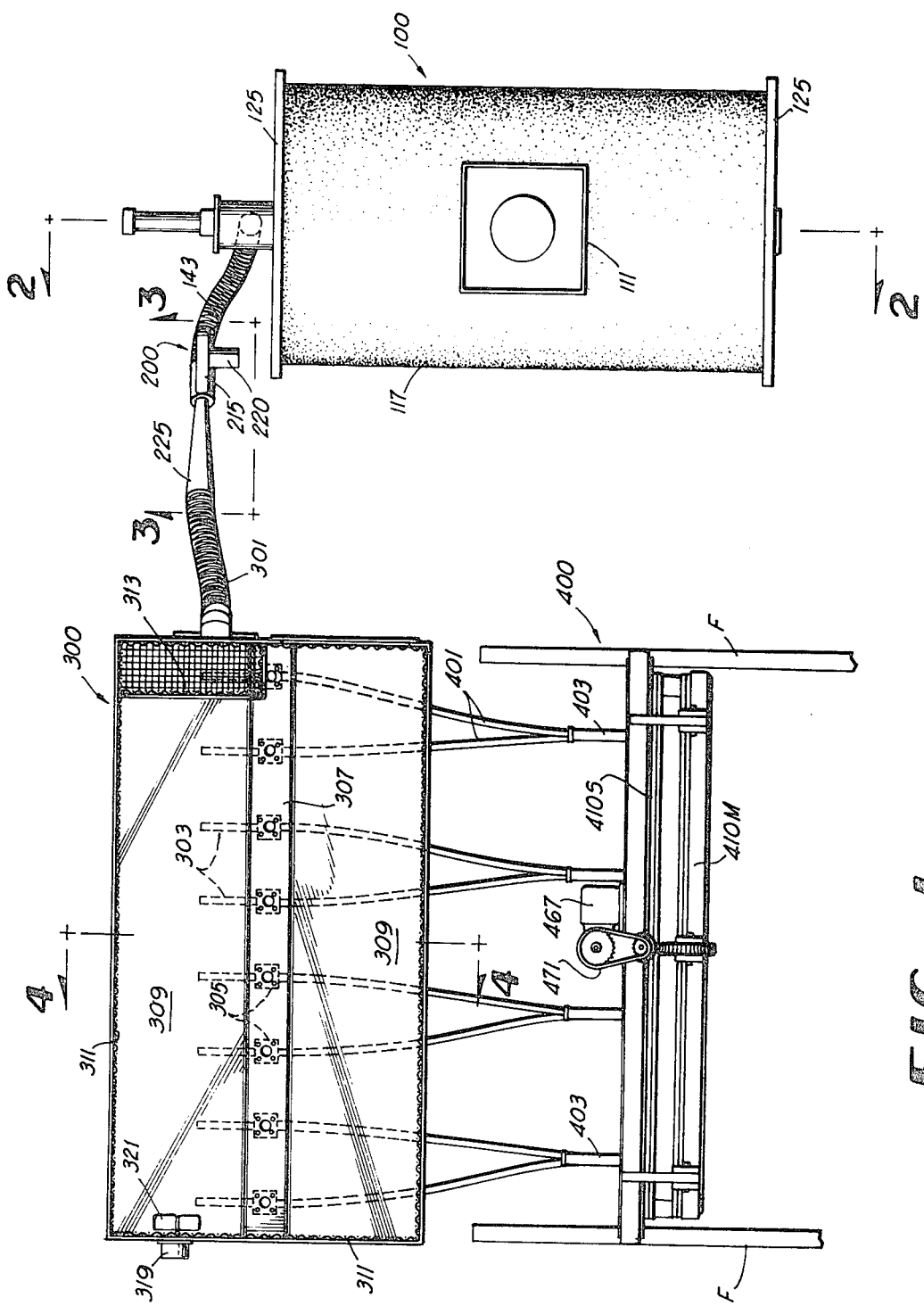
FIG. 1 is a partly diagrammatic plan view of the apparatus components used in the practice of the method.

Referring to the drawings in detail, wherein like numerals designate like parts, FIG. 1 depicts a planned layout of the entire apparatus used in the method of producing molded foam board according to this invention. It may be seen in FIG. 1 that the apparatus comprises four basic components, the first of which is a large cylindrical tank 100 which is a pre-expander tank for polystyrene beads containing about 6% pentane gas at a bulk density of 40 pcf, such beads or pellets being metered into the large tank 100 at the top thereof, as will be further described.

The untreated polystyrene beads in the pre-expander tank 100 are pressurized and subjected to vacuum, as will be fully described, and are expanded in the tank to a bulk density of 1 to 5 pcf to produce an intermediate product known in the art as prepuff.

After pre-expansion in the tank 100, the prepuff is conveyed under suction through a quick draft blower 200 into a holding bin 300. This holding bin at its bottom, FIG. 4, has feed bowls 305 to pneumatically feed input lines or tubes 401 of a molding apparatus 400 which constitutes the fourth and final major apparatus component. As will be fully described, the prepuff from the bin 300 is delivered through the lines 401 to injector means on the mold apparatus near the top and bottom thereof, and superheated steam is introduced to complete the expansion of the product. Water is then employed to cool the mold and stabilize the fused foam board product while forming a skin thereon, following which the board is ejected from the mold.

Figure 2:
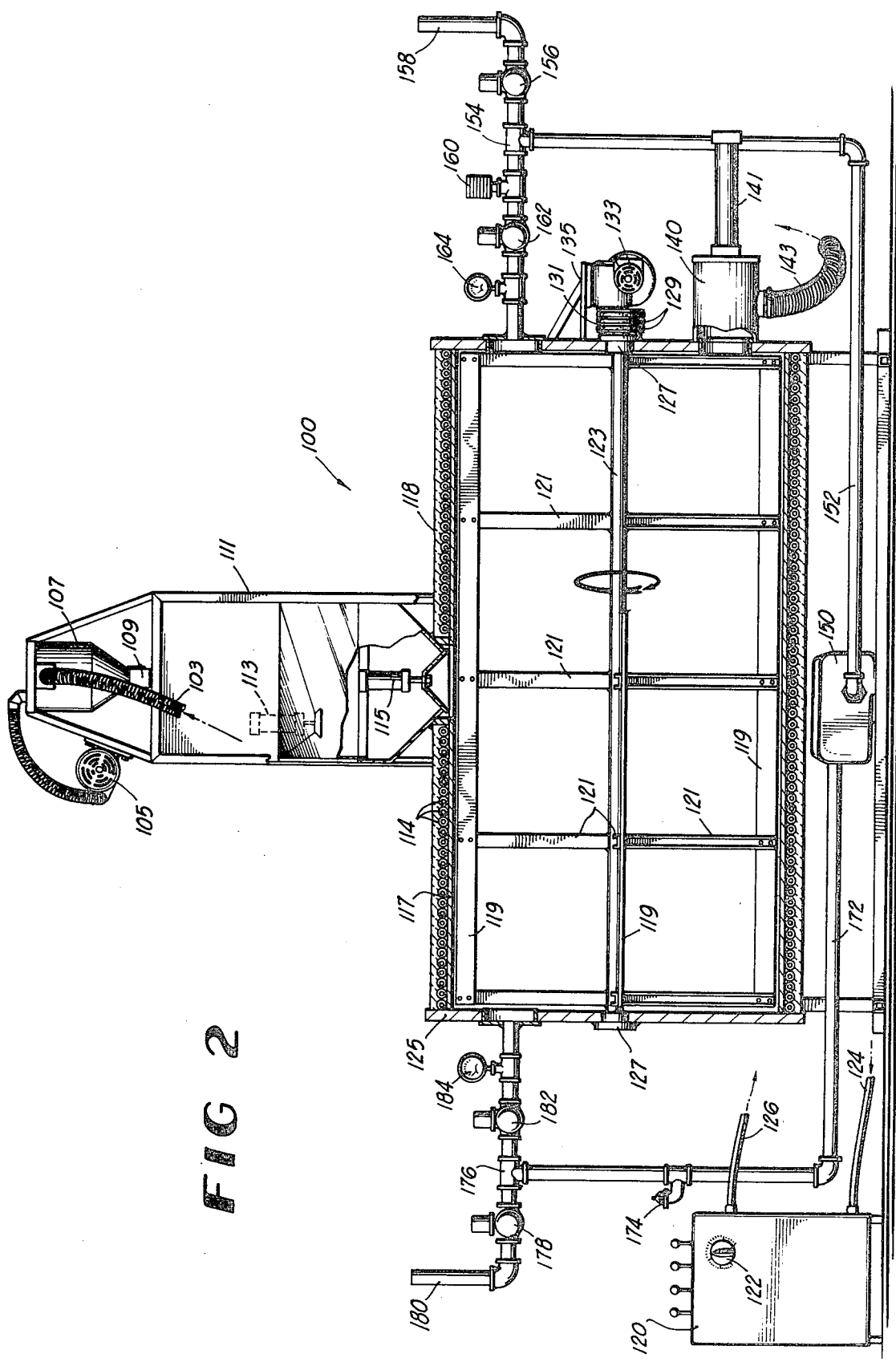
FIG. 2 is an enlarged central vertical section taken on line 2—2 of FIG. 1.

The details of pre-expander tank 100 are shown in FIG. 2, wherein a delivery tube 103 feeds the raw polystyrene beads through an induction delivery motor 105 to an elevated hopper 107. This hopper has a valve 109 which, when open, will feed the beads to a second hopper 111 which is the metering hopper to the cylindrical tank 117.

This metering hopper 111 has a pair of metering cylinders 113 and 115. Pneumatic cylinder 115 is operable to stop or start the flow of beads into the tank 117, and also acts as a closure mechanism for the tank upon pressurizing or drawing a vacuum in the tank.

Within the cylindrical tank 117 are longitudinal agitator wiper blades 119 fixed to radial struts 121, in turn secured to a central axle 123 journaled at each end on tank end walls 125 by bearings 127. At one end of the axle or shaft 123, a pair of belts 129 attached to a pulley 131 of the shaft are driven by a gear head motor 133 fixed to one side wall 125 by a motor mount 135. It should be noted that the wiper blades 119 do not contact the cylindrical tank wall and a slight space exists between each blade edge and the inner cylindrical tank surface.

Coiled around the cylindrical tank between the end walls 125 are heat transfer coils 114 to which oil is fed through an oil pump and heater located in a control box 120. Control box 120 has a thermostat 122 to regulate the heat of the oil, and also located on the control box are conventional controls for the pneumatic system which pressurizes and evacuates the tank 117 in proper sequence.

Oil is taken into the heater from the coils 114 through a line 124 and is pumped from the heater to the coils 114 through another line 126, FIG. 2.

The beads are continuously wiped by the wiper blades 119 against the heated tank wall. The cylindrical tank wall is thermally insulated by insulating material 118.

At the lower portion of one end wall 125, an exit chute 140 for the prepuff is mounted and this chute is opened and closed at proper times by a pneumatic cylinder 141 to allow the prepuff to exit the tank 117 through a conduit 143. This same cylinder 141 also serves as the opening and closing means for tank 117 during pressurization or evacuation of the tank.

Located below the tank 117 is an air pump 150 having an air line 152 connected to a T-fitting 154 on one side of which is a solenoid valve 156 which is vented to atmosphere by a standpipe 158.

On the other side of the fitting 154 is a pressure relief valve 160 which vents pressure in excess of 14 psi. On the tank side of the pressure relief valve 160 is another solenoid valve 162 and a pressure-vacuum gage 164. The pipe carrying these elements is coupled into the adjacent tank end wall 125 in communication with the tank interior.

To the left of air pump 150, FIG. 2, is an air line 172 having a vacuum relief device 174 connected therein which relieves vacuum in excess of 20 psi. The line 172 is coupled to a T-fitting 176 near the other tank end wall 125. Another solenoid valve 178 is connected outwardly of the fitting 176 so that the tank can exhaust to atmosphere through a standpipe 180. Another solenoid valve 182 is located inboard of fitting 176 and another pressure and vacuum gage 184 is provided, as shown. The adjacent end of the pipe 172 is coupled in the tank end wall 125 and communicates with the interior atmosphere of the tank.

In the operation of the pre-expander tank 100, with the wiper blades 119 at rest, metering cylinder 115 in hopper 111 is opened and cylinder 114 of exit chute 140 is closed. A vacuum is drawn in the tank by pump 150. Solenoid valve 178 is closed and solenoid valve 182 is open, and the pump 150 begins to draw vacuum in line 172 while air is pumped out of line 152 on which solenoid valve 162 is closed and valve 156 is open, thereby pumping air from the tank 100 through exhaust pipe 158 to the atmosphere and drawing into the tank from the metering hopper 111 the polystyrene beads to be pre-expanded.

Following this filling step and with the cylinder 115 closing the tank 117, the tank is now pressurized. The wiper blades 119 are driven rotationally and the controls of all of the valves described in the above tank filling step are reversed. Air pump 150 continues to pump air through line 152 to T-fitting 154 where solenoid valve 156 is closed to prevent exhausting air to the atmosphere. Air is therefore pumped through pressure relief valve 160 and now open solenoid valve 162 into the tank 117. Solenoid valve 182, being closed, prevents air from leaving the tank 117 and air to supply the pump 150 is drawn in through the open standpipe 180 and open solenoid valve 178 and through line 172.

In the next operational step, a vacuum is drawn in the tank 117. The cycle of operation is the same as in the initial tank filling step with the various valves operating in the manner described, except that the metering cylinder 115 is closed rather than open.

Following this, the several solenoid valves are opened which relieves pressure within the tank 117 so that it may stabilize at atmospheric pressure. The wiper blades 119 are now moving.

The next and final step in the operation of the pre-expanding tank 100 is to discharge the pre-expanded material (prepuff) through the chute 140. This operation is identical to the second step above where the tank was pressurized, except that cylinder 141 is retracted or opened to uncover the exit hole in chute 140 and allow the quick draft blower 200 to suck the prepuff through the conduit 143 and to then blow the material into the holding bin 300.

Figure 3:
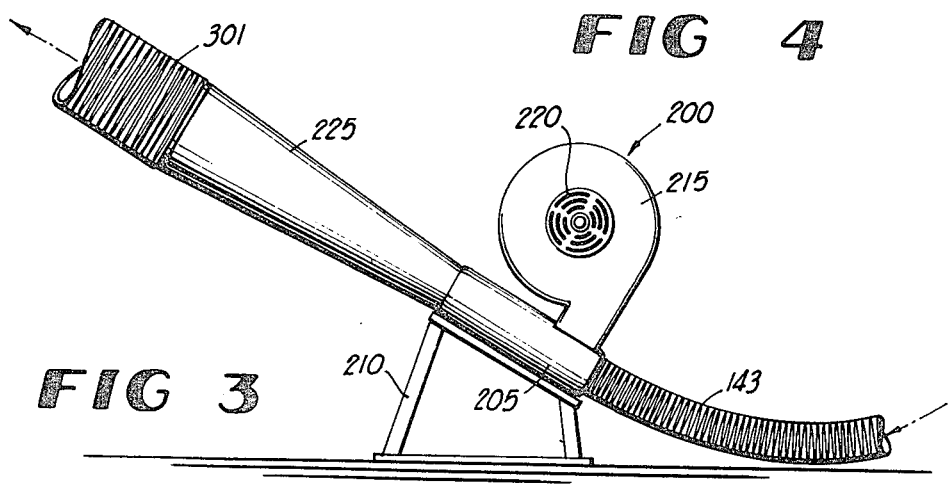
FIG. 3 is an enlarged fragmentary elevational view of blower means used to deliver prepuff from the expander tank to a holding bin.

Quick draft blower 200 in FIG. 3, after extracting by suction the prepuff through the conduit 143 from the pre-expander tank 100, blows the prepuff up through a flexible conduit 301 located on one end of the holding bin 300, FIG. 1. The quick draft blower 200 comprises a draft chamber 205 fixed to a stationary mounting frame 210 and above which is arranged a squirrel cage suction blower 215 driven by an electric motor 220. The prepuff, after being drawn through conduit 143, is blown through a venturi 225 extending from draft chamber 205 and into a larger conduit 301 connected into the prepuff holding bin 300.

Figure 4:
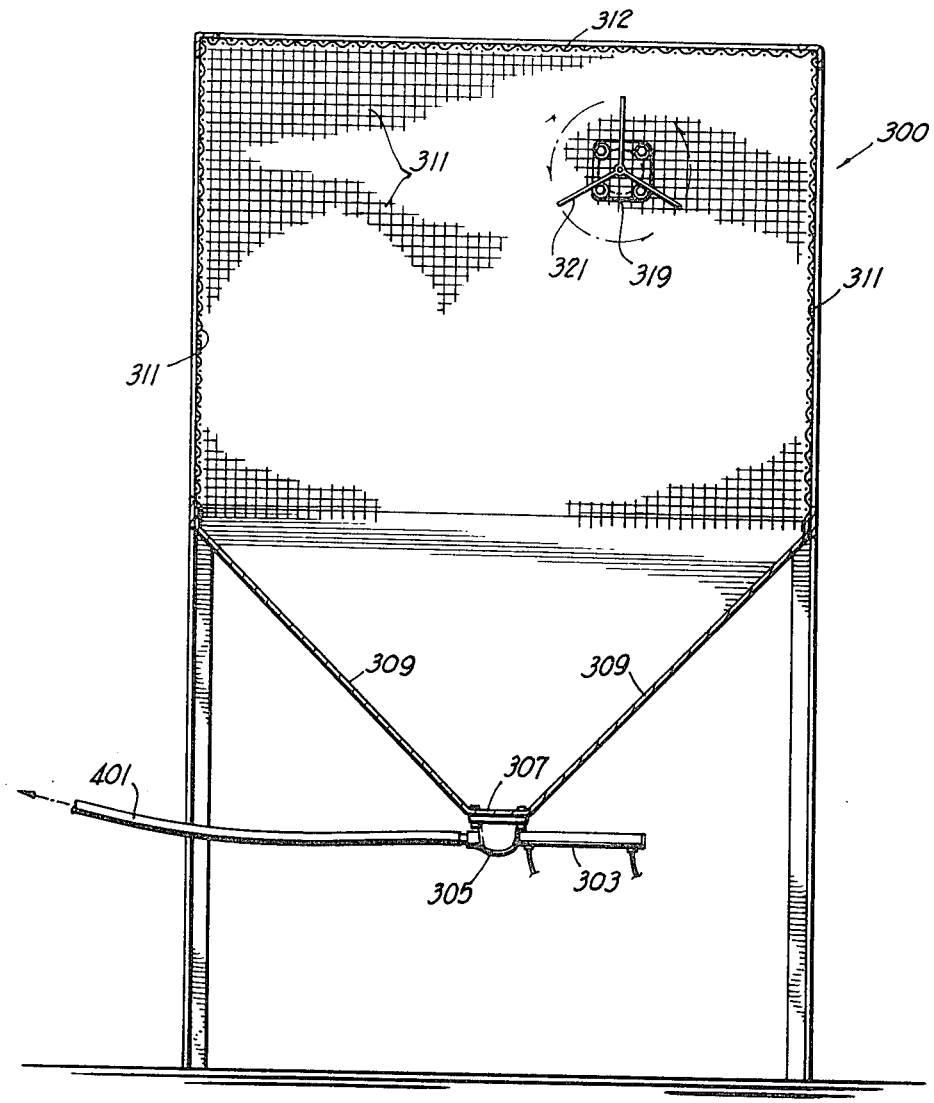
FIG. 4 is an enlarged vertical section through the holding bin taken on line 4—4 of FIG. 1.

As shown in FIGS. 1 and 4, holding bin 300 is merely a rectangular cross section wire mesh cage with a sloping hopper bottom composed of smooth imperforate converging walls 309. This hopper bottom is truncated to form a flat trough-like area 307 to which the spaced feed bowls 305 are connected in registration with openings in the area 307 to extract the prepuff by the operation of pneumatic feed bowl cylinders 303. The prepuff then enters the feed lines 401 which transport the material to the molding apparatus 400.

The prepuff holding bin 300 has an interior wire cage 313, FIG. 1, within its main wire mesh walls 311. This interior cage 313 is located at the outlet end of the conduit 301 leading from the quick draft blower 200. The cage 313 serves to de-lump any material which may have adhered in a mass and disperses the stream of prepuff being blown into the holding bin 300 by the quick draft blower.

At the far end of holding bin 300 is a material level indicator consisting of a slow turning motor 319 driving slow paddle blades 321 which, when met with resistance from the prepuff, enter a signal to the motor 319 which in turn, through conventional electronic controls, not shown, deactivates the blower 200 to terminate the feeding of material into the holding bin. The bin 300 also has a wire mesh top wall 312 which prevents the prepuff from floating over the top of or being blown out of the holding bin.

The molding apparatus 400 shown schematically in FIG. 1 is also shown in detail in FIGS. 5 through 8 of the drawings. The molding apparatus extracts the prepuff at a density of 1 to 5 pcf from the holding bin 300 through the feed lines 401 which lead to mold injector guns 403, FIG. 5. Like other injection molds, the apparatus 400 opens after the molding cycle and therefore one mold platen 410S is stationary and the opposite platen 410M is movable as shown in FIG. 5 to allow the board product B to exit the mold cavity MC. Each platen is equipped with conduits 411, attached to manifolds 413, held by hanger brackets 415 on the outer walls of the platens 410. The upper manifolds 413I are the intake manifolds through which fluid is fed to the platens via a flexible hose 412 on the moving platen and a fixed inlet line on the stationary platen.

The lower manifolds 413E are exhaust manifolds having solenoid valves 414 therein to selectively exhaust fluid from the two platens through drain pipes 416. The conduits 411 are secured through outer walls of the two platens and transport fluid into and away from the platens and their cavities.

Figure 7:
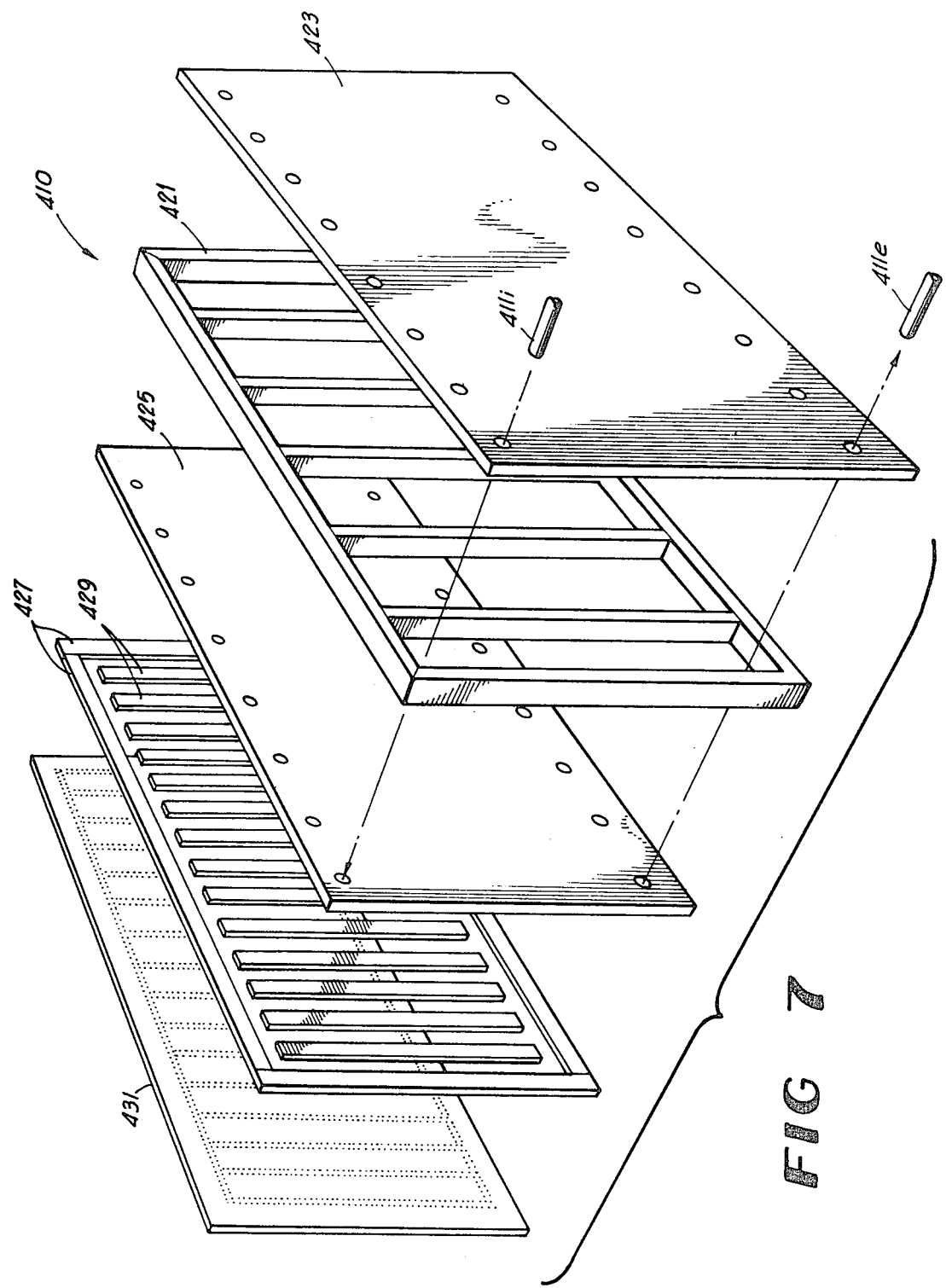
FIG. 7 is an exploded perspective view of one mold platen.

FIG. 7 is an exploded view of one mold platen 410, both of which are substantially identical and are of composite construction. Each platen has a frame 421 for rigidity and this frame has fixed to each side thereof outer and inner walls 423 and 425. These walls are apertured as shown in FIG. 7 to receive the conduits 411 and the conduits terminate at the inner frame wall 425. The conduits carry fluid to a fluid chamber formed by fluid confining edge rails 427 and fluid directing baffles 429 disposed in a common plane with the edge rails 427. This fluid chamber forming means in the assembled platen is sandwiched between the inner wall 425 and the apertured mold face 431 of the platen.

As stated, the two platens 410S and 410M are identically constructed except that the platen 410M is arranged to move in a swinging path, FIG. 5, relative to the stationary platen; and the stationary platen 410S is suited with a plurality of mold injector guns 403 and pneumatic knock-out mechanisms 405. These mechanisms are merely small pneumatic cylinders with piston rods extending through the platen and knock-out bars 407 fixed to the distal ends of the piston rods, FIG. 6. When the bars 407 are retracted, they are flush with the mold face wall 431 to retain a uniformly smooth facing on the molded product B.

Figure 8:
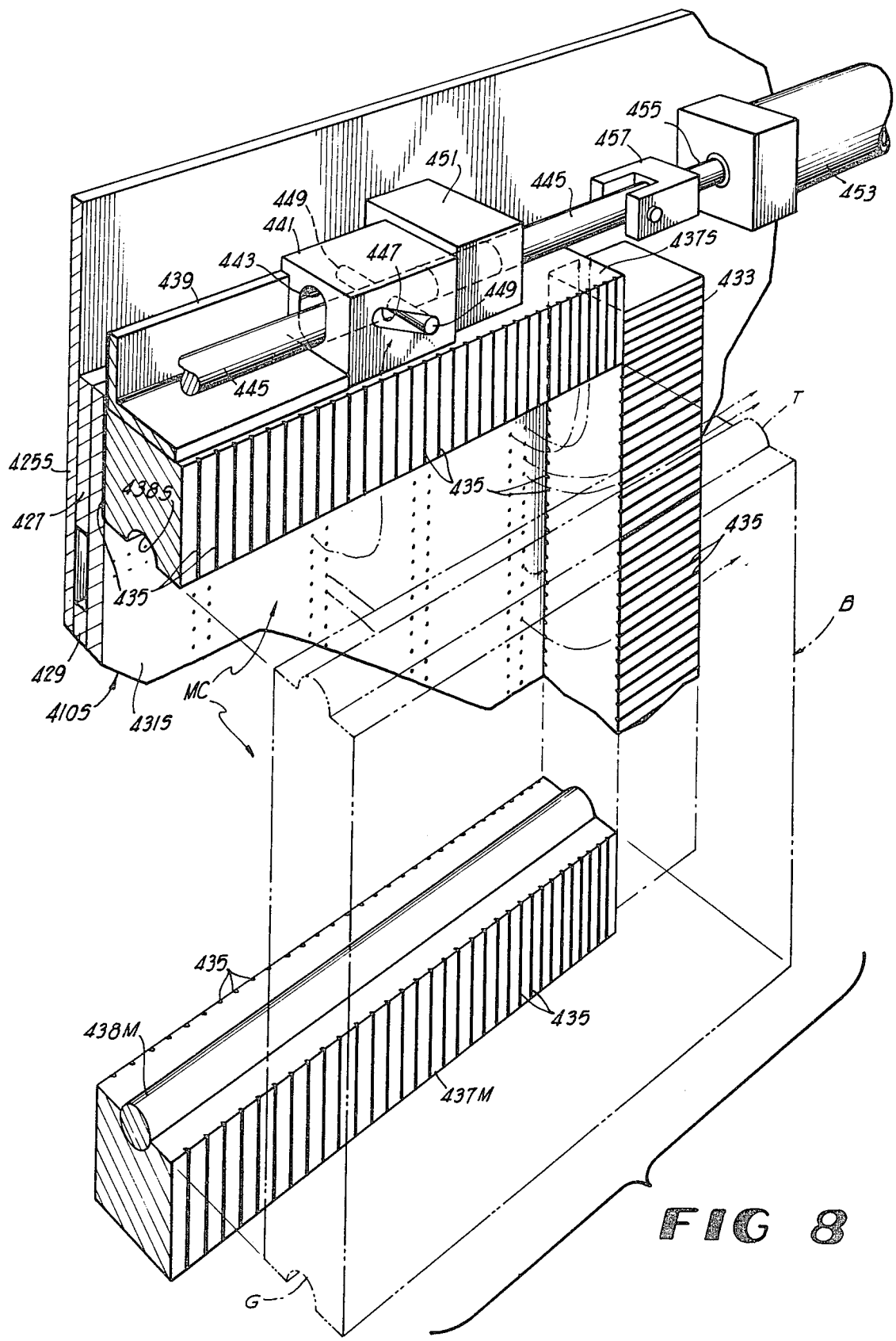
FIG. 8 is an enlarged fragmentary perspective view of means forming the mold cavity, partly in section.
Figure 9:
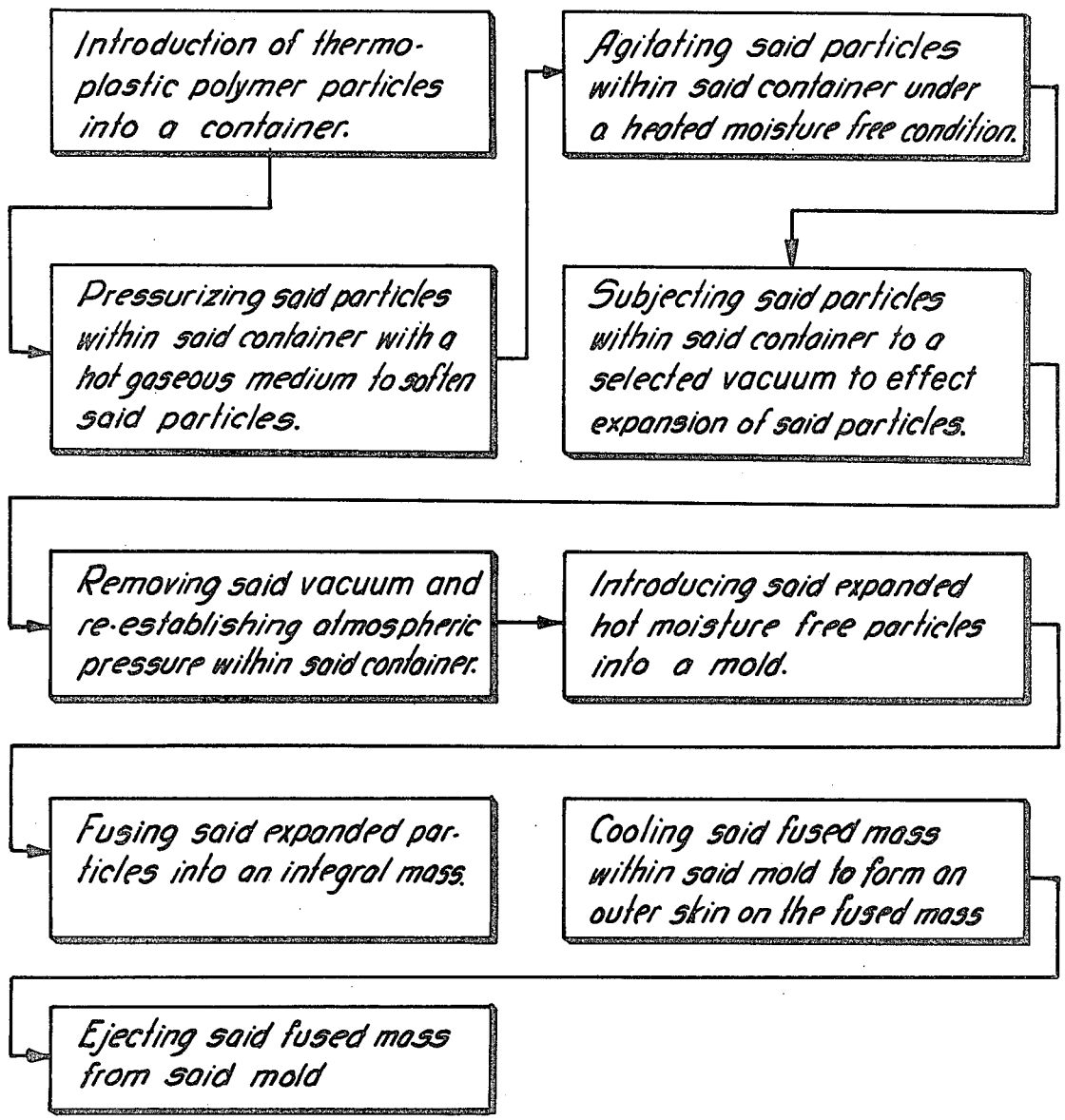
FIG. 9 is a flow diagram showing the method.

The opposite sides of the mold cavity MC are established by the two platens 410S and 410M, above described. The mold cavity must be further defined and closed around its edges, and the means for achieving this are best shown in FIG. 8. Referring to this figure, a portion of the composite wall structure of platen 410S is shown in cross section with the parts in assembled relationship. Fixed rigidly to the platen 410S are mold cavity side rails 433 on each side and extending vertically across the mold face wall 431S. These rails 433 have a plurality of transverse fluid escape slots 435 on opposite sides thereof adjacent to the two mold face walls 431S and 431M. Top and bottom horizontal edge rails 437S and 437M at right angles to the side rails 433 complete the formation and the closure of the mold cavity MC. These rails 437 are similar to the side rails 433 and have transverse fluid escape slots 435 on opposite sides facing the walls 431S and 431M.

The upper rail 437S is not fixed to the adjacent wall 431S as are side edge rails 433. Instead, upper rail 437S is fixed to an angle bar 439, held by a cam block 441 which has a pair of slots, one of which is a vertically elongated slot 443, which receives a cam lug shaft 445. The other slot 447 in cam block 441 is perpendicular to slot 443 and is inclined and elongated to cammingly engage a cam lug 449. Cam lug shaft 445 is slidable within a pillow block 451, fixed to the inner frame wall 425S of the platen 410S.

At one end of the cam lug shaft 445 is a pneumatic cylinder 453 which is fixed to the frame F of molding machine 400. The shaft 445 is joined to the piston rod 455 of cylinder 453 through a yoke 457. The rail 437S has an arcuate cross section longitudinal slot 438S in its lower face which molds a tongue T on the molded board product B. Similarly, lower rail 437M on the moving platen 410M has a complementary arcuate cross section longitudinal rib 438M on its upper face which molds a groove G in the board product B.

At this point in the description, it should be noted that the lower edge rail 437M is associated with cam operating means identical to that shown and described in connection with the upper edge rail 437S. The lower edge rail 437M is located on the bottom edge of wall 431M of the moving platen 410M, in order to provide for a free gravity discharge of the molded board B when the lower rail 437M is moved outwardly with the movable platen, FIG. 5.

Figure 6:
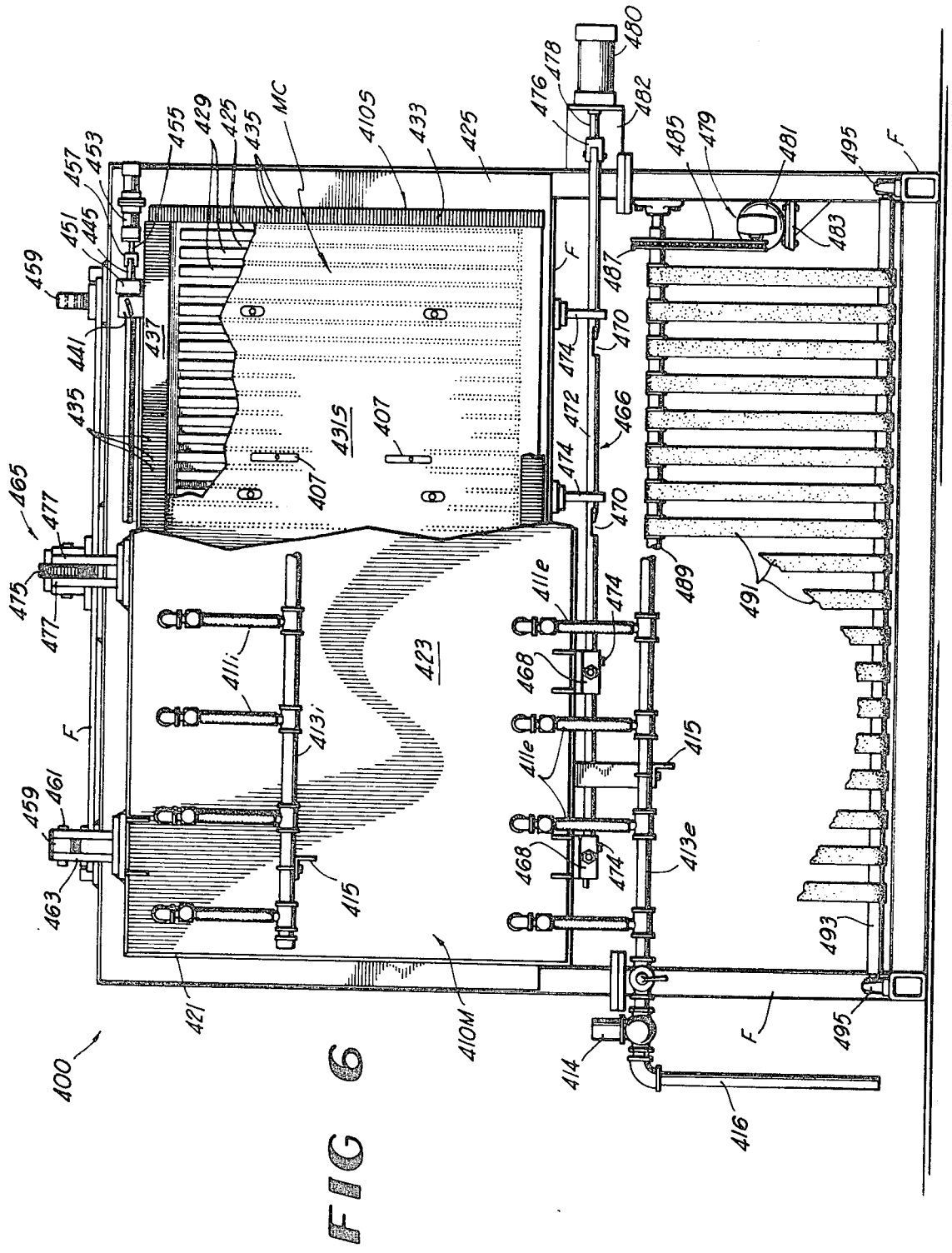
FIG. 6 is a side elevational view of the molding apparatus in FIG. 5, with parts broken away.

The platens 410S and 410M are hinged along a common upper edge by hinge plates 459, FIG. 6, on the upper frame section of the apparatus 400, and secured by pins 461 to complementary hinge plates 463 on the upper frame 421 or member of the moving platen 410M. The mechanism 465 for moving the platen 410M is disposed midway between the two hinges, FIG. 6, and consists of a gear head motor 467 located on the upper part of frame F by suitable motor mounts. A power take-off shaft 469 is coupled with drive gearing 471 to drive a worm gear 473, FIG. 5, which meshes with a worm wheel 475, fixed to the moving platen 410M by worm wheel brackets or cranks 477. Consequently, when the gear head motor 467 is energized, the described mechanism 465 is operated to open or close the moving platen.

When the mold apparatus is closed, it must be locked and sealed to maintain the integrity of the mold cavity, and for this purpose, there is provided at the lower edges of platens 410S and 410M a mold locking mechanism 466. This mechanism comprises latching bars 468 adjustably secured to the lower edge of moving platen 410M. These latching bars are hooked to engage cam slots 470 in a cam slide bar 472. The cam slide bar is slidably mounted to the bottom of stationary platen 410S through slide bar brackets 474. The slide bar 472 is activated to latch through its connection with a yoke 476, FIG. 6, connected to the piston rod 478 of a pneumatic cylinder 480 carried by a bracket 482 on the mold frame F. When the cylinder 480 retracts the rod 478 with the slide bar 472, the hooked latching bars 468 on the moving platen are released through the cam slots on the bar and the moving mechanism 465 may be energized.

A final mechanism associated with the molding apparatus 400 is a conveyor mechanism 479, FIGS. 5 and 6. When the molding cycle is completed, the conveyor mechanism is energized to carry the molded board B away from the mold apparatus to a collection and storage station. The conveyor mechanism 479 comprises a gear head motor 481 fixed to frame F through a motor mount 483. It is operatively connected through gearing 485 to a conveyor drive shaft sprocket 487 to drive shaft 489 rotationally. This, in turn, drives endless belts 491 in the direction of the arrows over idler shafts 493 journaled in bearings 495 to the frame F.

The cycle of operation of the molding apparatus 400 necessary to produce the molded board B is as follows:
(1) Gear head motor 467 of mechanism 465 is energized to close moving mold platen 410M, and pneumatic cylinder 480 is activated to lock the two platens 410S and 410M in sealed opposing relationship. Solenoid valves 414 on each exhaust manifold 413E are opened to allow air to exit the mold cavity MC. The upper and lower mold rails 437S and 437M are in the retracted or outermost positions.
(2) The pneumatic mold injector guns 403 fill the mold cavity MC with the prepuff from holding bin 300.
(3) Mold rails 437S and 437M are cammed toward each other thus compressing the material in the mold cavity.
(4) Solenoid valve 414 is energized to close on the stationary platen 410S while the valve 414 on the moving platen 410M remains open.
(5) Superheated steam enters the stationary platen cavity to expand and fuse the prepuff in the mold cavity. This steam passes through the prepuff at the stationary wall 431S and exits the apertured mold face wall 431M on the moving platen 410M. A portion of that superheated steam passes out of the mold cavity through the slots 435 of edge rails 433 and 437. When back pressure is sensed at the steam source, a surface skin has been formed on the product B at the stationary platen mold face wall 431S.
(6) At this time, solenoid valve 414 on the moving platen 410M is closed.
(7) Steam enters hose 412 leading to the intake manifold 413 on the moving platen and passes through conduits 411 into the moving platen cavity to form a skin on the product B adjacent to the wall 431M of the moving platen.
(8) Both drains are opened via solenoid valves 414 on the stationary and moving platen manifolds 413E. Water enters both intake manifolds 413 and flushes the cavities of the platens to cool the mold and stabilize the molded product.
(9) Upper mold rail 437S and lower rail 437M are retracted to their outermost positions by cylinders 453.
(10) Pneumatic cylinder 480 retracts its rod 478 to disengage the locking means between the stationary and moving platens.
(11) The platen moving mechanism 465 is again activated to swing open the moving platen.
(12) The solenoid valve 414 of the stationary platen is closed and pressurizing air enters the stationary platen cavity to loosen the foam board product B from the stationary mold face wall 431S.
(13) Pneumatic knock-out cylinders 405 are impulsed, and knock-out bars 407 push the board product B out of the stationary platen 410S.
(14) The conveyor mechanism 479 delivers the board product B away from the molding machine to a storage station.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An apparatus for molding expandable thermoplastic polymer particles comprising a stationary frame, a stationary mold platen on said frame, a companion opposing mold platen movably mounted on said frame for movement toward and away from the stationary platen, edge rail members associated with said stationary and movable platens and defining therewith a single mold cavity, said members comprising a pair of parallel edge rail members fixedly secured to one end of said platens and a second pair of edge rail members mounted for movement toward and away from each other between said parallel members, power actuated camming means connected with said second pair of edge rail members to shift them toward and away from each other, means to move the movable platen relative to the stationary platen, means to inject expandable particles into said mold cavity, means to deliver steam to one platen only of said mold, said steam passing through the mold cavity in one direction only and expanding and fusing said particles in the mold cavity, and means to cool the mold following fusion of said particles into an integral molded mass in said mold cavity.

2. Apparatus as in claim 1 and further comprising a rib and a groove respectively on the opposing faces of said second pair of edge rail members, said rib and groove being adapted to form complementary configurations on the edge of an article being molded.

3. Apparatus as defined in claim 1, and means to eject molded products from the mold cavity including means to pressurize a cavity of one platen and mechanical product ejection means on such platen.

4. Apparatus as defined in claim 1, and said apparatus being an upright apparatus with said frame and mold platens substantially vertically disposed while molding, said movable platen being pivoted at its top and being vertically swingable toward and away from the stationary platen, and said conveyor means connected with said frame at an elevation below said stationary and movable platens.

5. Apparatus as defined in claim 1, and means to lock said movable and stationary platens in opposing parallel sealed relationship with opposite faces of said edge rail members.

6. Apparatus as defined in claim 1, and all of said edge rail members of said pairs being provided on opposite sides thereof facing said stationary and movable platens with a multiplicity of spaced fluid vent slots.

7. Apparatus as defined in claim 1, and said movably mounted mold platen being pivoted near one end for swinging movement relative to the stationary platen.

8. Apparatus as defined in claim 1, and each mold platen comprising a frame, a pair of wall members abutting opposite sides of said frame, means forming a fluid confining chamber at the side of one wall member away from said frame, and an apertured mold face member abutting the side of said last-named means away from said frame.

* * * * *